United States Patent
Davis et al.

(10) Patent No.: US 6,856,729 B2
(45) Date of Patent: Feb. 15, 2005

(54) WAVELENGTH MONITOR UTILIZING A TUNABLE BRAGG GRATING AND BLAZED GRATING

(75) Inventors: Michael A. Davis, Glastonbury, CT (US); Alan D. Kersey, South Glastonbury, CT (US)

(73) Assignee: CiDRA Corporation, Wallingford, CT (US)

( * ) Notice: Subject to any disclaimer, the term of this patent is extended or adjusted under 35 U.S.C. 154(b) by 50 days.

(21) Appl. No.: 10/098,924

(22) Filed: Mar. 16, 2002

(65) Prior Publication Data

US 2002/0150336 A1 Oct. 17, 2002

Related U.S. Application Data

(60) Provisional application No. 60/276,456, filed on Mar. 16, 2001.

(51) Int. Cl.[7] .................................................. G02B 6/34
(52) U.S. Cl. ........................ 385/37; 385/12; 385/47; 385/48; 372/6; 372/96; 359/572
(58) Field of Search ............................ 385/37, 12, 14, 385/16, 31, 48, 9, 10, 47; 372/6, 96, 20, 32, 50, 102; 359/566, 569, 572

(56) References Cited

U.S. PATENT DOCUMENTS 6,002,822 A * 12/1999 Strasser et al. ............... 385/48

* cited by examiner

Primary Examiner—Phan T. H. Palmer

(57) ABSTRACT

A wavelength monitoring device is provided having an optical reflecting element for reflecting an incoming optical signal to a detector, wherein the device features a narrowband optical reflecting element for reflecting only a narrowband portion of the incoming optical signal to the optical reflecting element. The narrowband optical reflecting element has a reflection function having a bandwidth and shape that determines the narrowband portion of the incoming optical signal. The narrowband optical reflecting element may be a Bragg grating for spectrally processing the incoming optical signal, while the optical reflecting element may be a blazed Bragg grating for reflecting the spectrally processing incoming optical signal to the detector. The detector determines an amount of optical power reflected by the Bragg grating and discriminates between reflections of individual gratings, and is a spatial filter for providing a direct correlation between individual detector elements and a specific wavelength range. The narrowband optical reflecting element includes a glass element having a Bragg grating arranged therein. The glass element may be either an optical fiber having a diameter of about 125 microns, or a large diameter waveguide having a diameter of at least about 0.3 millimeters.

34 Claims, 3 Drawing Sheets

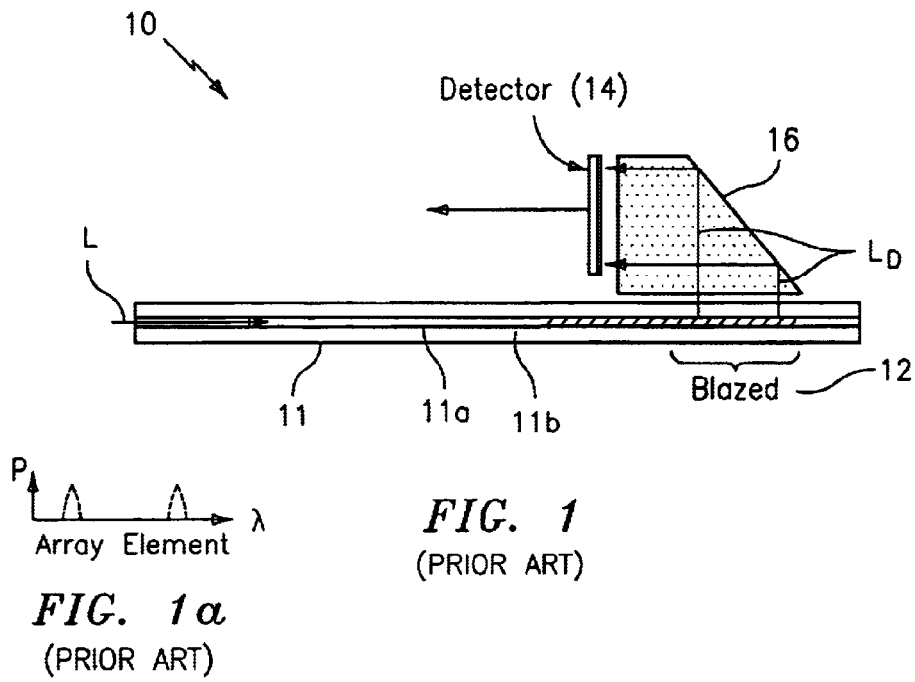
FIG. 1
(PRIOR ART)
FIG. 1a
(PRIOR ART)
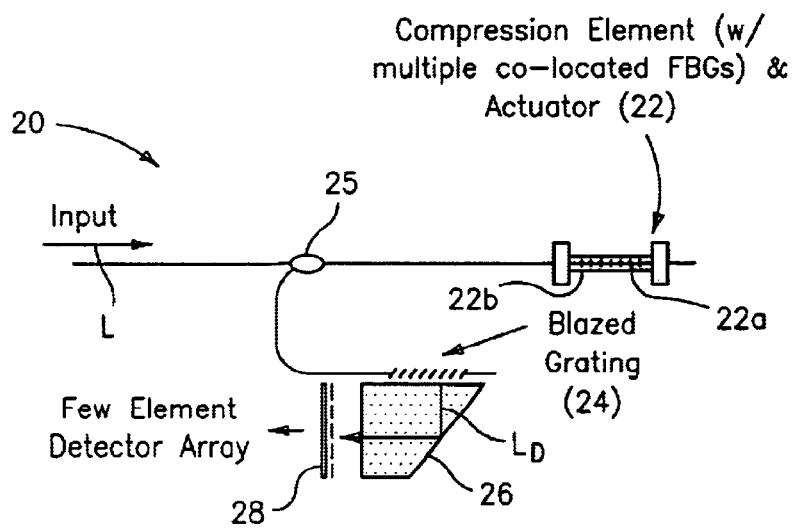
FIG. 2
FIG. 2a

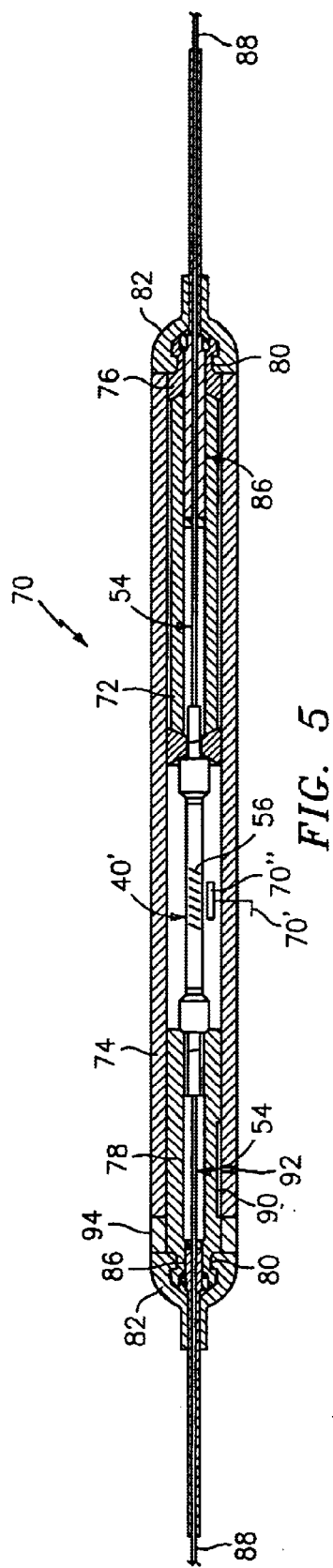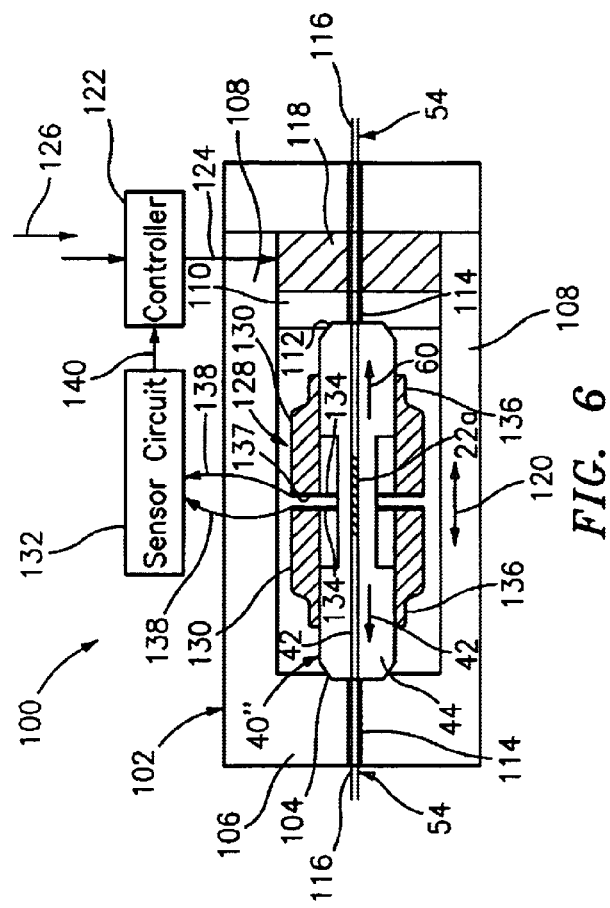

WAVELENGTH MONITOR UTILIZING A TUNABLE BRAGG GRATING AND BLAZED GRATING

CROSS-REFERENCE TO RELATED APPLICATIONS

This application claims the benefit of U.S. patent application Ser. No. 09/455,868, filed Dec. 12, 1999; U.S. patent application Ser. No. 09/455,865, filed Dec. 6, 1999, which is a continuation-in-part of U.S. patent application Ser. No. 09/399,495, filed Sep. 20, 1999, now abandoned, which is continuation in part of U.S. patent application Ser. No. 09/205,943, filed Dec. 4, 1998, now abandoned; U.S. application Ser. No. 09/707,084, filed Nov. 6, 2000, which is a continuation-in-part of U.S. patent application Ser. No. 09/691,997, filed Oct. 19, 2000, which is continuation of U.S. patent application Ser. No. 09/456,112, filed Dec. 6, 1999, now granted (U.S. Pat. No. 6,229,827), which is a continuation-in-part of U.S. patent application Ser. No. 09/400,362 filed Sep. 20, 1999, now abandoned, which is a continuation-in-part of U.S. patent application Ser. No. 09/205,846, filed Dec. 4, 1998, now abandoned; U.S. application Ser. No. 09/699,940, filed Oct. 30, 2000, which is a continuation-in-part of U.S. patent application Ser. No. 09/519,240, filed Mar. 6, 2000; and U.S. Provisional Application No. 60/276,456, filed Mar. 16, 2001; and is further related to applications filed concurrently herewith, entitled "Optical Grating Based Filter" U.S. Ser. No. 10/098,890; and, "Large Diameter Optical Waveguide Having a Blazed Grating Therein", U.S. Ser. No. 10/098,923, all of which are hereby incorporated by reference in their entirety.

BACKGROUND OF THE INVENTION

1. Technical Field

The present invention generally relates to an optical system; and more particularly to an system for monitoring the wavelength or some other optical parameter of an optical signal.

2. Description of Related Art

FIG. 1 shows a wavelength monitoring device 10 that is known in the art, constructed using an optical fiber 11 having a fiber core 11a, a cladding 11b surrounding the fiber core 11a and a blazed fiber Bragg grating 12 written in the fiber core 11a, and used in conjunction with a detector array 14, as shown and described in U.S. Pat. No. 6,002,822, issued to Lucent Technologies, Inc., which is hereby incorporated by reference in its entirety. (See also U.S. Pat. No. 5,337,382 which discloses a 125 micron optical fiber having Bragg gratings written therein at an oblique angle, which are known in the art as blazed gratings, which is also incorporated by reference herein.)

In FIG. 1, the blazed fiber grating 12 is used to decouple light generally indicated as L from the fiber core 1 a into the cladding 11b with the angle of departure from the fiber core 11a dependent on the wavelength of the light L. The decoupled light LD is reflected through a member 16. Using direct detection or with directing optics, the light L coupled into the cladding 11b can be detected using the detector array 14. As shown, the blazed fiber grating 12 serves as a wavelength dependent dispersive element and the detector array 14 as a spatial filter which gives a direct correlation between individual detector elements and a specific wavelength range. FIG. 1(a) shows the waveform of the detector array 14.

However, this technique has several drawbacks which limit its ultimate performance. When properly written, the blazed fiber grating will be able to create a uniform dispersion of the wavelengths covered by the grating element, but the ultimate resolution depends on the number and spacing of the detector array elements. If a full C-band (37 nanometers) device is desired, then a typical 256 element array will give a resolution of 145 picometers. If more resolution is desired, then an array with additional detectors (such as 512 elements) can be used; however, these devices can be quite expensive and the number of inoperable pixels dramatically increases as the total elements increase.

SUMMARY OF THE INVENTION

In its broadest sense, the present invention provides a device having a optical reflecting element for reflecting an incoming optical signal to a detector, wherein the device features a narrowband optical reflecting element for reflecting only a narrowband portion of the incoming optical signal to the optical reflecting element. In one embodiment, the narrowband optical reflecting element is a Bragg grating for spectrally processing the incoming optical signal and has a reflection function having a bandwidth and shape that determines the narrowband portion of the incoming optical signal.

The Bragg grating of the narrowband optical reflecting element is written in a glass element that is a large diameter waveguide having a diameter of at least about 0.3 millimeters, although embodiments are envisioned in which the it may be implemented in an optical fiber having a diameter of about 125 microns.

The optical reflecting element is a blazed Bragg grating also written in a large diameter waveguide for reflecting the spectrally processing incoming optical signal to the detector, although embodiments are envisioned in which the it may be implemented in an optical fiber having a diameter of about 125 microns.

The detector receives the incoming optical signal from the blazed Bragg grating, determines an amount of optical power reflected by the Bragg grating and discriminates between reflections of individual gratings. The detector is a spatial filter for providing a direct correlation between individual detector elements and a specific wavelength range.

The device further comprises an optical coupler arranged between the narrowband optical reflecting element and the optical reflecting element.

The narrowband optical reflecting element may be compression tunable. In this case, the narrowband optical reflecting element would be in the form of a tunable glass compression element having the large diameter optical waveguide with the Bragg grating arranged therein and arranged in relation to an actuator. The actuator provides a compression force on the tunable glass compression element for tuning the Bragg grating. The large diameter waveguide may have a dogbone shape. The Bragg grating may include one Bragg grating, as well as multiple co-located or concatenated Bragg gratings.

The device is shown and described as a wavelength monitoring device, but may also be implemented in other types of devices, such as an optical channel analyzer.

One advantage of the present invention is that it enables the use of less costly components and produce a higher resolution wavelength discriminator. For example, a much less expensive detector may be used to perform channel monitoring.

The foregoing and other objects, features and advantages of the present invention will become more apparent in light of the following detailed description of exemplary embodiments thereof.

BRIEF DESCRIPTION OF THE DRAWING

The drawing, not drawn to scale, include the following Figures:

FIG. 1 is a diagram of a wavelength monitoring device that is known in the art.

FIG. 1(a) shows a graph of power versus wavelength of a waveform from a detector array shown in FIG. 1.

FIG. 2 is a diagram a wavelength monitoring device in accordance with the present invention.

FIG. 2(a) shows a graph of power versus wavelength of a waveform from a compression element shown in FIG. 2.

FIG. 5 is a cross-sectional view of an a thermal device in accordance with the present invention.

FIG. 6 is a view of a tunable device having a positional/force feedback control circuit in accordance with the present invention.

BEST MODE FOR CARRYING OUT THE INVENTION

FIG. 2: The Basic Invention

Figure 4A:
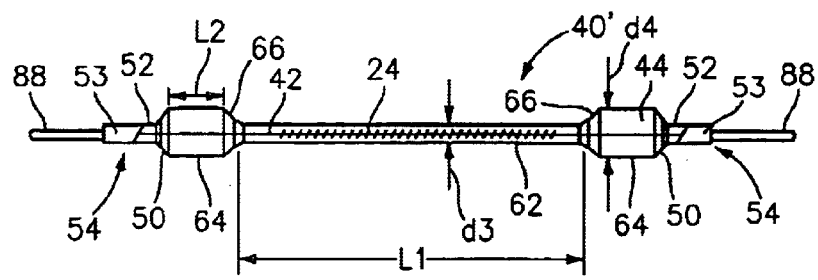
FIG. 4(a) is a view of another embodiment of a large diameter optical waveguide having a blazed grating written therein in accordance with the present invention.

FIG. 2 shows, by way of example, a wavelength monitoring device or system generally indicated as 20 in accordance with the present invention. The wavelength monitoring device 20 has a compression element and actuator generally indicated as 22 with a Bragg grating 22a and has a blazed grating 24. In operation, the incoming light L is directed from a coupler 25 onto one or more Bragg gratings 22a located in a glass element 22b which serve to spectrally process the incoming optical signal L. The reflected components of the light L are then directed via the coupler 25 onto the blazed grating 24 which reflects the light out of the fiber core onto a detector array 28. The decoupled light LD is reflected through a member 26. In this configuration, the resolution of the wavelength monitoring device 20 is determined primarily by the one or more Bragg gratings 22a, which reflect only a narrowband portion of the incoming light determined by a bandwidth and shape of a filter function of the Bragg gratings 22a. Since the detector array 28 no longer determines the resolution of the wavelength monitoring device 20, the detector array 28 now only functions to determine the amount of optical power reflected by the Bragg gratings 22a and to discriminate between the reflections of the individual gratings. Therefore, the number of detector elements in the detector array 28 required is greatly reduced and directly dependent only on the number of gratings 22a used in the grating array. In turn, the cost of the detector array 28 can then be greatly reduced.

The scope of the invention is also intended to cover a continuous wavelength range by the device 20, where the gratings 22a in the glass element 22b would be scanned over a certain range. This scanning can be accomplished in a variety of ways, including thermal or strain tuning techniques. In each case, the tuning mechanism would have a limited range over which it can tune the gratings 22a, as a result, to cover a large range, multiple gratings would be required with each grating responsible for a certain band of the total wavelength span.

Moreover, the scope of the invention is shown and described in relation to an optical channel monitoring (OCM) device which typically monitors the present or absence of one or more channels, or the power of one or more channels. However, the scope of the invention is also intended to include using the invention in an optical channel analyzer (OCA) device, in which signal-to-noise ratios, bit rates, and other parameters of the one or more channels could be analyzed.

The Large Diameter Optical Waveguide Structure

Figure 3A:
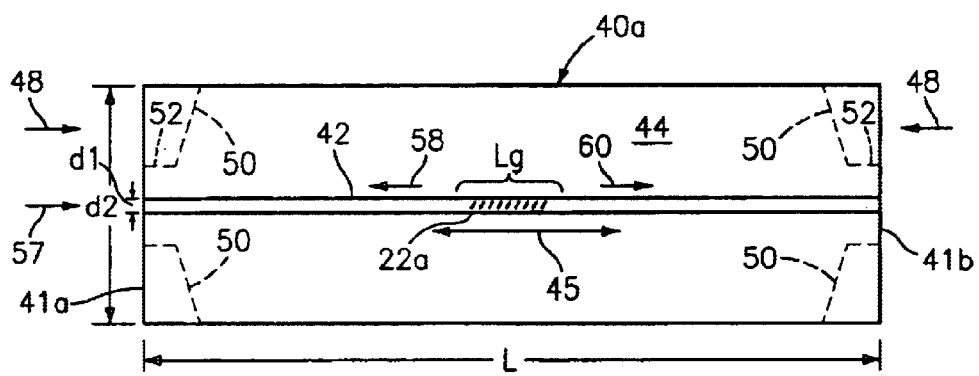
FIG. 3(a) is a view of a large diameter optical waveguide having a grating written therein in accordance with the present invention.
Figure 3B:
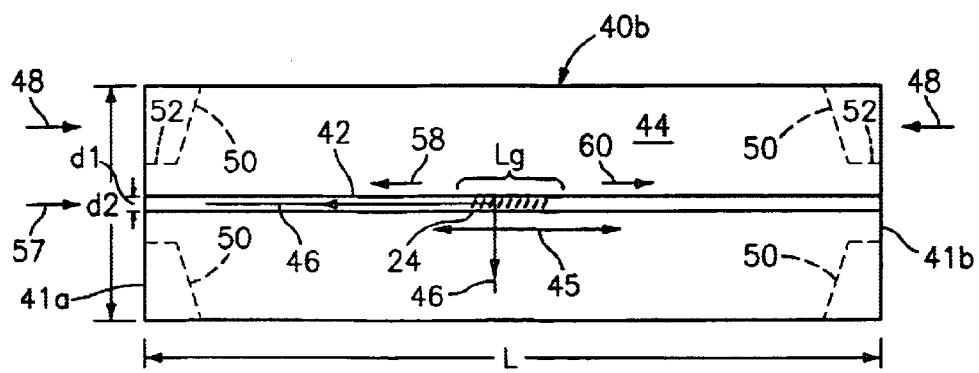
FIG. 3(b) is a view of a large diameter optical waveguide having a blazed grating written therein in accordance with the present invention.

FIG. 3(a) shows a large diameter optical waveguide 40a having the Bragg grating 22a (See FIG. 2), and FIG. 3(b) shows a large diameter optical waveguide 40b having the blazed Bragg grating 24 (See FIG. 2). Similar parts in FIGS. 3(a) and 3(b) are similarly labelled. In view of the overlap in structure and functionality of these waveguides, the description below primarily focuses on the waveguide 40a shown in FIG. 3(a).

However, in alternative embodiments of the waveguides 40a, 40b described herein after in more detail, having all of the various features and advantages described herein, may comprise an inner cladding positioned between the core and the outer cladding. Further, the present invention includes waveguides having various different cladding layers comprising glass layers having different refractive indexes or other optical qualities.

The large diameter optical waveguides 40a has an inner core 42 and an outer cladding 44 surrounding the inner core 42, has opposing ends 41a, 41b, and has a diameter d2 of at least about 0.3 millimeters, similar to that disclosed in the aforementioned co-pending U.S. patent application Ser. No. 09/455,868 entitled "Large Diameter Optical Waveguide, Grating, and Laser" (CC-0230). The inner core 42 has the Bragg grating 22a written therein for tuning by applying a compressive force indicated by arrows 48 on the opposite ends 41a, 41b of the optical waveguide 40a. In FIG. 3(b), the blazed grating 24 is a grating written at an oblique angle relative to the axis of the inner core 42 to reflect an optical signal generally indicated as 46 into the outer cladding 44 of the waveguide 180 and to pass an output signal.

The large diameter optical waveguides 40a, 40b comprise silica glass ($SiO_2$) based material having the appropriate dopants, as is known, to allow light indicated by arrow 45 to propagate in either direction along the inner core 42 and/or within the large diameter optical waveguides 40a, 40b. The inner core 42 has an outer dimension d1 and the large diameter optical waveguide 40a has an outer dimension d2. Other materials for the large diameter optical waveguides 40a, 40b may be used if desired. For example, the large diameter optical waveguides 40a, 40b may be made of any glass, e.g., silica, phosphate glass, or other glasses; or solely plastic.

The outer dimension d2 of the outer cladding 44 is at least about 0.3 millimeters; and the outer dimension d1 of the inner core 42 is such that it propagates only a few spatial modes (e.g., less than about 6). For example for single spatial mode propagation, the inner core 42 has a substantially circular transverse cross-sectional shape with a diameter d1 less than about 12.5 microns, depending on the wavelength of light. The invention will also work with larger or non-circular cores that propagate a few (less than about 6) spatial modes, in one or more transverse directions. The outer diameter d2 of the outer cladding 44 and the length L have values that will resist buckling when the large diameter optical waveguide 40a is placed in axial compression as indicated by the arrows 48.

The large diameter optical waveguides 40a, 40b may be ground or etched to provide tapered (or beveled or angled) outer corners or edges 50 to provide a seat for the large diameter optical waveguides 40a, 40b to mate with another part (See FIG. 5 or 6) and/or to adjust the force angles on the large diameter optical waveguides 40a, 40b, or for other reasons. The angle of the beveled corners 50 is set to achieve the desired function. Further, the large diameter optical waveguides 40a, 40b may be etched or ground to provide nubs 52 for an attachment of a pigtail assembly 54 (see FIG. 3a) to the large diameter optical waveguides 40a, 40b. Further, the size of the large diameter optical waveguides 40a, 40b has inherent mechanical rigidity that improves packaging options and reduces bend losses.

In the large diameter optical waveguide 40a, the Bragg grating 22a is impressed (or embedded or imprinted) therein. A Bragg grating 22a, as is known, is a periodic or aperiodic variation in the effective refractive index and/or effective optical absorption coefficient of an optical waveguide. The aperiodic variation of the gratings described herein may include a chirped grating. As shown, the grating 22a is written in the inner core 42; however, the scope of the invention is intended to include writing the grating in the outer cladding 44, as well as a combination of the inner core 42 and the outer cladding 44. Any type of wavelength-tunable grating or reflective element embedded, etched, imprinted, or otherwise formed in the large diameter optical waveguide 40a may be used. The large diameter optical waveguide 40 may be photosensitive if the grating 22a is to be written into the large diameter optical waveguide 40a. As used herein, the term "grating" means any of such reflective elements. Further, the reflective element (or grating) 22a may be used in reflection and/or transmission of light. The incoming light 57 incident on the grating 22a reflects a portion thereof as indicated by a line 58, and passes the remaining incident light 57 (within a predetermined wavelength range), as indicated by a line 60 (as is known).

The blazed grating 22a has a grating length Lg, which is determined based on the application, may be any desired length. A typical grating 22a has a grating length Lg in the range of about 3–40 millimeters. Other sizes or ranges may be used if desired. The length Lg of the blazed grating 22a may be shorter than or substantially the same length as the length L of the large diameter optical waveguide 40a. Also, the inner core 42 need not be located in the center of the large diameter optical waveguide 40a but may be located anywhere in the large diameter optical waveguide 40a.

Accordingly, we have found that an outer diameter d2 of greater than about 400 microns (0.4 millimeters) provides acceptable results (without buckling) for a waveguide length L of 5 millimeter, over a grating wavelength tuning range of about 10 nm. For a given outer diameter d2, as the length L increases, the wavelength tuning range (without buckling) decreases. Other diameters d2 for the large diameter optical waveguide 40a may be used depending on the overall length L of the large diameter optical waveguide 40a and the desired amount of compression length change ΔL or wavelength shift Δλ.

The large diameter optical waveguide 40a may be made using fiber drawing techniques now known or later devel-oped that provide the resultant desired dimensions for the core and the outer diameter discussed hereinbefore. As such, the external surface of the large diameter optical waveguide 40a will likely be optically flat, thereby allowing Bragg gratings to be written through the cladding similar to that which is done for conventional optical fiber. Because the large diameter optical waveguides 40a, 40b have a large outer diameter compared to that of a standard optical fiber (e.g., 125 microns), the large diameter optical waveguides 40a, 40b may not need to be coated with a buffer and then stripped to write the gratings, thereby requiring less steps than that needed for conventional optical fiber gratings. Also, the large outer diameter d2 of the large diameter optical waveguides 40a, 40b, allows the waveguide to be ground, etched or machined while retaining the mechanical strength of the large diameter optical waveguides 40a, 40b. Thus, the present invention is easily manufacturable and easy to handle. Also, the large diameter optical waveguides 40a, 40b may be made in long lengths (on the order of many inches, feet, or meters) then cut to size as needed for the desired application.

Also, the large diameter optical waveguides 40a, 40b does not exhibit mechanical degradation from surface ablation common with optical fibers under high laser fluency (or power or intensity) during grating exposure (or writing). In particular, the thickness of the cladding between the cladding outer diameter and the core outer diameter causes a reduced power level at the air-to-glass interface for a focused writing beam.

We have also found that the present invention also reduces coupling between the core and cladding modes due to the increased end cross-sectional area between the core and cladding of the waveguide. Thus, the gratings 22a and 56 written in the inner core 42 of the large diameter optical waveguides 40a, 40b exhibit less optical transmission loss and a exhibits a cleaner optical profile than a conventional fiber grating because the large cladding region dissipates coupled cladding modes, thereby reducing the coupling of the inner core 42 to the outer cladding 44 modes. In general, the greater the difference in cross-sectional area between the inner core 42 and the outer cladding 44 the smaller the mode field overlap and the lower the coupling to the cladding modes. The thickness of the outer cladding 44 between the cladding outer diameter and the core outer diameter may be set to optimize this effect. Other diameters of the inner core 42 and the large diameter optical waveguides 40a, 40b may be used if desired such that the cladding modes are reduced to the desired levels.

The large diameter optical waveguides 40a, 40b may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

FIG. 4(a): The Dogbone Shaped Structure

FIG. 4(a) shows a cross-section of a large diameter optical waveguide 40', which may have a varying geometry depending on the application. For example, the large diameter optical waveguide 40' may have a "dogbone" shape with a narrow central section 62 and larger outer sections 64. The dogbone shape may be used to provide increased sensitivity in converting axial force to length change ΔL and/or wavelength shift Δλ of the blazed grating 56 and may be achieved by etching, grinding, machining, heating & stretching, or other known techniques. It is important to note that the.

The central section 62 may have an outer diameter d3 of about 0.8–1 millimeter, and a length L of about 5–20 millimeter. The outer sections 164 each have a diameter d4 of about 3 millimeter and a length L2 of about 2–5 millimeter. The overall length L1 is about 10–30 millimeter and the multi-component grating has a length Lg of about 5–20 millimeter. Other lengths and diameters of the sections 62, 64 may be used. Other dimensions and lengths for the grating element 24 and the multi-component grating may be used.

An inner transition region 66 of the outer sections 64 may be a sharp vertical or angled edge or may be curved. A curved geometry has less stress risers than a sharp edge and thus may reduce the likelihood of breakage. Further, the outer sections 64 may have tapered (or beveled) outer corners 50.

We have found that such a dimension change between the dimension d4 of the outer sections 64 and the dimension d3 of the central section 62 provides increased force to grating wavelength shift sensitivity (or gain or scale factor) by strain amplification. Also, the dimensions provided herein for the dogbone are easily scalable to provide the desired amount of sensitivity.

The dimensions and geometries for any of the embodiments described herein are merely for illustrative purposes and, as such, any other dimensions may be used if desired, depending on the application, size, performance, manufacturing requirements, or other factors, in view of the teachings herein.

The angle of the beveled corners 50 is set to achieve the desired function. In addition, one or both of the axial ends of the large diameter optical waveguide 40' where a pigtail 53 of the pigtail assembly 54 attaches may have an outer tapered (or fluted, conical, or nipple) axial section 52.

Alternatively, the optical waveguide 40' may be formed by heating, collapsing and fusing a glass capillary tube to a fiber (not shown) by a laser, filament, flame, etc., as is described in the aforementioned co-pending U.S. patent application Ser. No. 09/455,865 (CC-0078B). Other techniques may be used for collapsing and fusing the tubes to the fiber, such as is discussed in U.S. Pat. No. 5,745,626, entitled "Method For And Encapsulation Of An Optical Fiber", to Duck et al., and/or U.S. Pat. No. 4,915,467, entitled "Method of Making Fiber Coupler Having Integral Precision Connection Wells", to Berkey, which are incorporated herein by reference to the extent necessary to understand the present invention, or other techniques. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The blazed Bragg grating 56 may be written in the inner core 42 before or after the capillary tube is encased around and fused to the fiber, such as is discussed in the aforementioned co-pending U.S. patent application Ser. No. 09/455,865 (CC-0078B). If the blazed grating 56 is written in the fiber after the tube is encased around the grating, the grating may be written through the tube into the fiber by any desired technique, such as is described in the aforementioned co-pending U.S. patent application Ser. No. 09/205,845 (CiDRA Docket No. CC-0130).

It is well known that the center wavelength at which a blazed Bragg grating reflects may shift up or down due to the expansion or contraction of the large diameter optical waveguide 40', in response to the changes in temperature or other environmental factors. Thus, it is desirable to provide a tuning mechanism to compensate for the spectral shift spectral filter profile 24 due to change in temperature.

The dogbone feature of the invention is shown and described in relation to a large diameter optical waveguide having the blazed grating 56. However, the scope of the invention is also intended to include using a large diameter optical waveguide having the grating 22a as shown in FIG. 3(a) in the form of a dogbone shape similar to the large diameter optical waveguide 40" in FIG. 6.

Figure 4B:
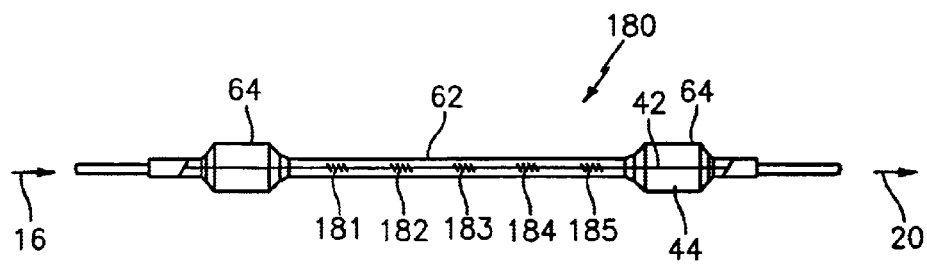
FIG. 4(b) is a view of another embodiment of a large diameter optical waveguide having a plurality of concatenated blazed Bragg gratings written therein in accordance with the present invention.

FIG. 4(b): Concatenated Periodic and/or Aperiodic Blazed Gratings

FIG. 4(b) shows a large diameter optical waveguide 180 having a plurality of concatenated periodic and/or aperiodic blazed gratings 181–185 spaced along the inner core 42 of the central section 62, wherein each blazed grating 181–185 is representative of a component of the Fourier series defining the desired grating profile. The blazed gratings 181–185 are written into the inner core 42 at an oblique angle relative to the axis of the core to reflect an optical signal into the outer cladding 44 of the large diameter optical waveguide 180 and pass the output signal 20. It is also contemplated by the present invention that the concatenated blazed gratings 181–185 of FIG. 4(b) may be written in an optical waveguide having a non-uniform central portion.

FIG. 5: The Athermal Device

FIG. 5 shows an athermal device 70 for compression-tuning the large diameter optical waveguide 40' to compensate for changes in temperature, which is similar to the athermal device described in the aforementioned U.S. patent application Ser. No. 09/699,940 (CiDRA Docket No. CC-0234A). The athermal device 70 includes the large diameter optical waveguide 40', attached pigtail assemblies 54, and a compensating spacer or rod 72, disposed in a tubular housing 74 formed of a high strength metal or metal alloy material, preferably having a low CTE that is higher than silica. As shown, the athermal device 70 includes an athermal element 70' that includes the member 25 and the detector 28 shown in FIG. 2 for athermalizing the same. The athermal element 70' has a connecting fiber 70" for coupling to the coupler 25 in FIG. 2.

A fixed end cap 76 and an adjustable end cap 78, which are formed of similar material as the tubular housing are welded in respective ends of the tubular housing 74 to secure and maintain in axial alignment the optical waveguide and compensating spacer 72. Both the fixed end cap 76 and the adjustable end cap 78 extend outward from the end of the tubular housing 74, and include a circumferential groove 80 for receiving a respective strain relief boot 82. Further, the fixed end cap 76 and the adjustable end cap 78 include a bore for receiving a respective strain relief device 86 and for passing the optical fiber 88 of the pigtail assemblies 54 therethrough.

The compensating spacer or rod 72 is disposed between the fixed end cap 76 and the large diameter optical waveguide 40'. The spacer 72 includes a stepped bore disposed axially for receiving the pigtail assembly 54 therethrough. The stepped bore has a diameter greater than the inner portion of the bore of the spacer to assure that no contact occurs between the spacer and the fiber during expansion and contraction of the athermal device 70.

The spacer 72 is formed of a metal or metal alloy, such as steel, stainless steel, aluminum, high expansion alloy. The CTEs and lengths of the large diameter optical waveguide 40', the end caps 76, 78 and the spacer 72 are selected such that the reflection wavelength of the blazed grating 56 does not substantially change over a predetermined temperature range (i.e., 100 °C). More specifically, the length of the spacer 72 is sized to offset the upward grating wavelength shift due to temperature and the thermal expansion of the tubular housing, waveguide and end caps. As the temperature increases, the spacer length expands faster than the optical waveguide, which shifts the grating wavelength down to balance the intrinsic wavelength shift up with increasing temperature. The length of the adjustable end cap is longer than the fixed end cap 76.

Additionally, a pair of planar surfaces 90 are ground or formed in the outer surface of the adjustable end cap 78 to maintain the adjustable end cap in a fixed rotational orientation to the tubular housing 74 and large diameter optical waveguide 40', during adjustment and mechanical burn-in process. The planar surfaces 90 are spaced radially at a predetermined angle (e.g., 120 degrees) and extend axially a predetermined length (i.e., 0.290 in.) to permit axial movement while maintaining the adjustable end cap 78 rotationally fixed. The planar surface 90 align with a pair of holes 92 disposed in the tubular housing 74, which are radially spaced 120 degrees. The holes 92 in the tubular housing 74 receive a pair of spring loaded pins (not shown), which are disposed within a collar (not shown) mounted on the outer surface of the tubular housing during assembly. The pins extend through the holes 92 to engage the planar surfaces 90 of the adjustable end cap 78, while the collar temporarily clamps the tubular housing to the adjustable end cap, before being welded to the tubular housing 74.

To complete the assembly of the athermal device 70, a ring 94, having a width substantially equal to the distance between the end of the tubular housing 74 and the strain relief boot 82, is placed over the adjustable end cap 78. The strain relief boots 82, which are formed of a polymer (e.g., Santoprene), are then snap fit into respective grooves 80 of the end caps 76, 78.

FIG. 6: Compression Tuning and Feedback Control

FIG. 6 shows a tuning device 100 that compresses axially a large diameter optical waveguide 40" using a non-optical closed control loop. The tuning device 100 is similar to that disclosed in co-pending U.S. patent application Ser. No. 09/707,084 entitled "Compression Tuned Bragg Grating and Laser", which is hereby incorporated herein by reference in its, as well as the aforementioned co-pending U.S. patent application Ser. No. 09/455,868 (CC-0230). The tuning device 100 shows in more detail an example of the compression element and actuator 22 in FIG. 2, which operates as follows:

The tuning device 100 compresses axially the large diameter optical waveguide 40" within a housing 102. One end of the large diameter optical waveguide 40" is pressed against a seat 104 in one end 106 of the housing 102. The housing also has a pair of arms (or sides) 108, which guide a movable block 110. The block 110 has a seat 112 that presses against the other end of the large diameter optical waveguide 40". The axial end faces of the large diameter optical waveguide 40" and/or the seats on mating surfaces 104, 112 may be plated with a material that reduces stresses or enhances the mating of the large diameter optical waveguide 40" with the seat on the mating surfaces. The ends of the housing 102 and the block 110 have a bore 114 drilled through them to allow the fiber 116 to pass therethrough. Instead of the recessed seats 104, 112, the end 106 of the housing 102 and the block 110 may provide a planar surface for engaging flush with the respective ends of the large diameter optical waveguide 40".

The housing 102 may be assembled such that a pre-strain or no pre-strain exists on the large diameter optical waveguide 40" prior to applying any outside forces.

An actuator 118, such as a piezoelectric transducer actuator, engages the moveable block 110, which causes the block to move as indicated by arrows 120. Accordingly, the PZT actuator 118 provides a predetermined amount of force to the moving block 110 to compress the large diameter optical waveguide 40", and thereby tune the grating 22a (see also FIG. 2) to a desired reflection wavelength. In response to a control signal generated by a displacement control circuit or controller 122 via conductor 124, the PZT actuator 118 is energized to provide the appropriate compression force necessary to tune the grating element to the desired Bragg reflection wavelength of the grating 22a. The control circuit 122 adjusts the expansion and retraction of the actuator 118 in response to an input command 126 and a displacement sensor 128 that provides feedback representative of the strain or compression of the large diameter optical waveguide 40" to form a non-optical closed-loop control configuration. In other words, light 57 propagating through the network or device is not used to provide feedback for the tuning of the grating 22a.

In one embodiment, the displacement sensor 128 includes a pair of capacitive elements 130 and a known displacement sensor circuit 132, similar to that disclosed in co-pending U.S. patent application Ser. No. 09/519,802, entitled, "Tunable Optical Structure Featuring Feedback Control", filed Mar. 6, 2000, which is incorporated by reference in its entirety. As shown in FIG. 4, each capacitive element 130 is generally tubular having an annular capacitive end surface 134. The capacitive elements may be formed of glass, plastic or other material. The capacitive elements 130 are mounted, such as welding or epoxy, to respective ends of the large diameter optical waveguide 40" at 136 such that the capacitive surfaces 134 are spaced a predetermined distance apart, for example, approximately 1–2 microns. Other spacings may be used if desired. The capacitive elements 130 may be bonded or secured using an epoxy or other adhesive compound, or fused to large diameter optical waveguide 40" using a $CO_2$ laser or other heating element. The capacitive surfaces 134 are coated with a metallic coating, such as gold, to form a pair of annular capacitive plates 137. The change in capacitance depends on the change in the spacing between the capacitive plates.

Electrodes 138 are attached to the capacitive plates 137 to connect the capacitor to the displacement sensor circuit 132. The sensor circuit 132 measures the capacitance between the capacitive plates 136 and provides a sensed signal 140, indicative of the measured capacitance, to the displacement controller 122. As the large diameter optical waveguide 40" is strained, the gap between the parallel capacitive plates 136 will vary, thereby causing the capacitance to change correspondingly. Specifically, as the grating is compressed, the gap between the capacitive plates 136 is reduced, resulting in an increase in capacitance. The change in capacitance is inversely proportional to the change in the reflection wavelength eb of the grating 22a. Since the capacitive elements 130 are directly connected to the large diameter optical waveguide 40", the capacitive elements are passive and will not slip. One skilled in the art would be able to implement without undue experimentation, the sensor electronics circuit 132 to measure the change in capacitance between the two capacitive plates 137.

In the operation of the tuning device 100, the controller 122 receives the wavelength input signal 126, which represents the desired reflection wavelength to tune the grating unit. In response to the input signal 126 and the sensed signal 140, which is representative of the present reflection wavelength of the grating 22a, the controller 122 provides a control signal 124 to the actuator 118 to increase or decrease the compression force applied to the large diameter optical waveguide 40" to set the desired reflection wavelength of the grating 22a. The change in applied force to the large diameter optical waveguide 40" changes the spacing between the ends of the grating 22a, and therefore, the spacing between the capacitive plates 137. As described above, the change in spacing of the capacitive plates 136 changes the capacitance therebetween provided to the sensor circuit 132, which provides displacement feedback to the controller 122. While the sensor circuit 132 and the controller 122 has been shown as two separate components, one would recognize that the functions of these components may be combined into a single component. One example of a closed loop actuator 118 that may be used is Model No. CM (controller) and DPT-C-M (for a cylindrical actuator) made by Queensgate, Inc. of N.Y.

Although the invention has been described with respect to using a capacitor 128 to measure the gap distance, it should be understood by those skilled in the art that other gap sensing techniques may be used, such as inductive, optical, magnetic, microwave, time-of-flight based gap sensors. Moreover, the scope of the invention is also intended to include measuring or sensing a force applied on or about the compressive element, and feeding it back to control the compression tuning of the optical structure. While the embodiment of the present invention described hereinbefore includes means to provide feedback of the displacement of a large diameter optical waveguide 40", one should recognize that the tuning devices may be accurately and repeatably compressed and thus may operate in an open loop mode.

Alternatively, instead of using a piezoelectric actuator 118, the large diameter optical waveguide 40" may be compressed by another actuator, such as a solenoid, pneumatic force actuator, or any other device that is capable of directly or indirectly applying an axial compressive force on the large diameter optical waveguide 40". Further, a stepper motor or other type of motor whose rotation or position can be controlled may be used to compress the waveguide. A mechanical linkage connects the motor, e.g., a screw drive, linear actuator, gears, and/or a cam, to the movable block 110 (or piston), which cause the block to move as indicated by arrows 120, similar to that described in pending U.S. patent application Ser. No. 09/751,589 entitled "Wide Range Tunable Optical Filter", filed Dec. 29, 2000 (CC-0274A); and U.S. patent application Ser. No. 09/752,332 entitled "Actuator Mechanism for Tuning an Optical Device", filed Dec. 29, 2000. (CC-0322), which are incorporated herein by reference. The stepper motor may be a high resolution stepper motor driven in a microstepping mode.

Alternatively, the grating 22a may be tuned by mechanically stressing (i.e. tension, bending) the grating elements, or varying the temperature of the grating (i.e., using a heater).

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein without departing from the spirit and scope of the present invention. For example, this invention is shown and described in relation to the gratings being a part of a large diameter optical waveguide; however, the scope of the invention is intended to include embodiments in which either the grating(s), blazed grating(s) or a combination thereof are arranged in a typical 125 micron optical fiber.

What is claimed is:

1. A device having an optical reflecting element for reflecting an incoming optical signal to a detector, the device comprising:

a narrowband optical reflecting element for reflecting only a narrowband portion of the incoming optical signal to the optical reflecting element, wherein the optical reflecting element comprises a blazed Bragg grating and the narrowband optical reflecting element comprises a Bragg grating for spectrally processing the incoming optical signal; and wherein the Bragg grating has a reflection function having a bandwidth and shape that determines the narrowband portion of the incoming optical signal.

2. A device according to claim 1, wherein the detector determines an amount of optical power reflected by the Bragg grating and discriminates between reflections of individual gratings.

3. A device according to claim 2, wherein the detector device comprises a spatial filter providing a direct correlation between individual detector elements and a specific wavelength range.

4. A device according to claim 3, wherein the device includes an athermal device having the large diameter optical waveguide with the blazed grating and the detector arranged therein.

5. A device according to claim 4, wherein the device further comprises an optical coupler arranged between the optical reflecting element and the narrowband optical reflecting element.

6. A device according to claim 1, wherein the device further comprises an optical coupler arranged between the optical reflecting element and the narrowband optical reflecting element.

7. A device according to claim 1, wherein the device is a wavelength monitoring device.

8. A device according to claim 1, wherein the optical reflecting element comprises a large diameter waveguide having a transverse dimension of at least about 0.3 millimeters.

9. A device according to claim 1, wherein the optical reflecting element comprises an optical fiber having a diameter of about 125 microns.

10. A device having an optical reflecting element for reflecting an incoming optical signal to a detector, the device comprising:

a narrowband optical reflecting element for reflecting only a narrowband portion of the incoming optical signal to the optical reflecting element, wherein the narrowband optical reflecting element comprises a glass element having a Bragg grating arranged therein.

11. A device according to claim 10, wherein the glass element comprises a large diameter waveguide having a transverse dimension of at least about 0.3 millimeters.

12. A device according to claim 10, wherein the glass element comprises an optical fiber having a diameter of about 125 microns.

13. A device according to claim 10, wherein the Bragg grating comprises multiple co-located Bragg gratings.

14. A device according to claim 10, wherein the Bragg grating comprises concatenated Bragg gratings.

15. A device according to claim 10, wherein the device further comprises an optical coupler arranged between the optical reflecting element and the narrowband optical reflecting element.

16. A device according to claim 10, wherein the device is a wavelength monitoring device.

17. A device according to claim 10, wherein the optical reflecting element comprises a large diameter waveguide having a transverse dimension of at least about 0.3 millimeters.

18. A device according to claim 10, wherein the optical reflecting element comprises an optical fiber having a diameter of about 125 microns.

19. A device having an optical reflecting element for reflecting an incoming optical signal to a detector, the device comprising:

a narrowband optical reflecting element for reflecting only a narrowband portion of the incoming optical signal to the optical reflecting element, wherein the narrowband optical reflecting element comprises a tunable glass compression element and actuator having a large diameter optical waveguide with a transverse dimension of at least about 0.3 millimeters and a Bragg grating arranged therein.

20. A device according to claim 19, wherein the large diameter waveguide has a dogbone shape.

21. A device according to claim 19, wherein the tunable glass compression element and actuator includes a housing having the large diameter optical waveguide arranged therein.

22. A device according to claim 19, wherein the actuator includes a transducer that provides a compression force on the large diameter optical waveguide for tuning the Bragg grating.

23. A device according to claim 19, wherein the tunable glass compression element and actuator also includes a position feedback circuit.

24. A device according to claim 19, wherein the device further comprises an optical coupler arranged between the optical reflecting element and the narrowband optical reflecting element.

25. A device according to claim 19, wherein the device is a wavelength monitoring device.

26. A device according to claim 19, wherein the optical reflecting element comprises a large diameter waveguide having a transverse dimension of at least about 0.3 millimeters.

27. A device according to claim 19, wherein the optical reflecting element comprises an optical fiber having a diameter of about 125 microns.

28. A wavelength monitoring device comprising:

a Bragg grating element that responds to an incoming optical signal and reflects only a narrowband portion thereof;

a blazed grating element for reflecting the narrowband portion of the incoming optical signal; and an optical detector that responds to the narrowband portion of the incoming optical signal, for monitoring the wavelength of the incoming optical signal, wherein the Bragg grating element has a reflection function having a bandwidth and shape that determines the narrowband portion of the incoming optical signal.

29. A wavelength monitoring device according to claim 28, wherein the optical detector is a spatial filter for providing a direct correlation between individual detector elements and a specific wavelength range.

30. A wavelength monitoring device according to claim 28, wherein the wavelength monitoring device further comprises a coupling device arranged between the Bragg grating element and the blazed grating element.

31. A wavelength monitoring device, comprising:

a Bragg grating element that responds to an incoming optical signal and reflects only a narrowband portion thereof;

a blazed grating element for reflecting the narrowband portion of the incoming optical signal; and an optical detector that responds to the narrowband portion of the incoming optical signal, for monitoring the wavelength of the incoming optical signal, wherein the Bragg grating element includes a glass element having a Bragg grating arranged therein.

32. A wavelength monitoring device according to claim 31, wherein the optical detector determines an amount of optical power reflected by the Bragg grating and discriminates between reflections of individual gratings.

33. A wavelength monitoring device according to claim 31, wherein the optical detector is a spatial filter for providing a direct correlation between individual detector elements and a specific wavelength range.

34. A wavelength monitoring device according to claim 31, wherein the wavelength monitoring device further comprises a coupling device arranged between the Bragg grating element and the blazed grating element.

* * * * *